July 23, 1957 K. SCHRÖTER 2,800,004
MULTIPART ARTICULATED SHAFT, PARTICULARLY FOR AGRICULTURAL
MACHINERY, WHICH IS VARIABLE IN LENGTH DURING SERVICE
AND PROVIDED WITH A SAFETY CATCH
Filed Jan. 13, 1954 3 Sheets-Sheet 1
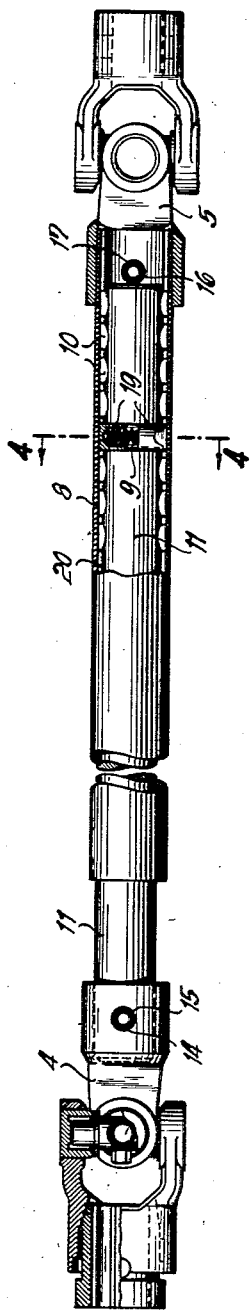
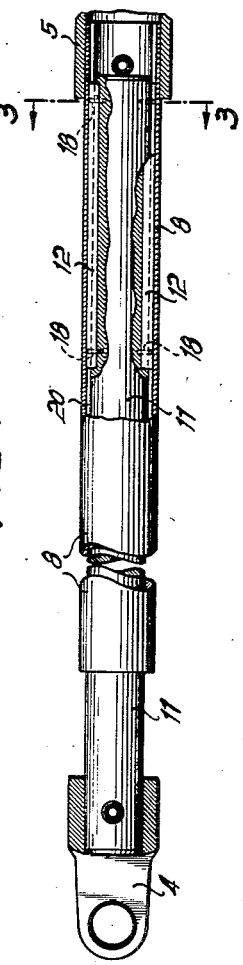
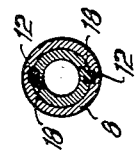
INVENTOR
K. Schroter
By Bryant & Lowry
ATTYS.

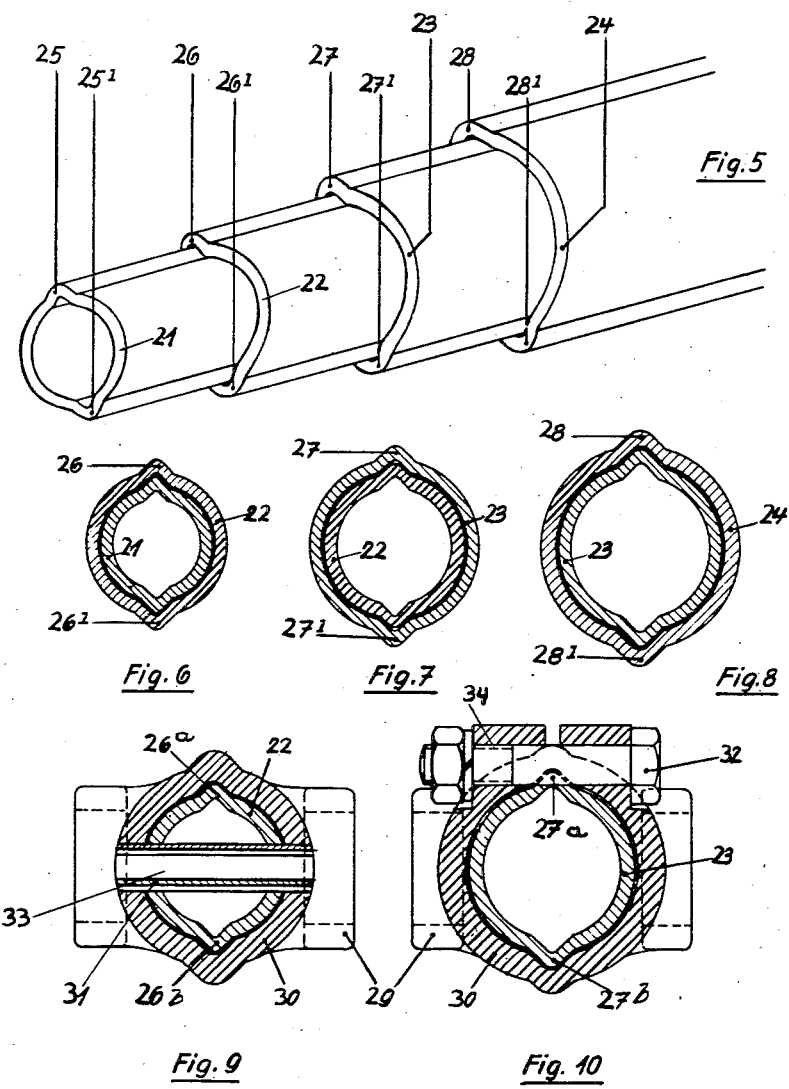

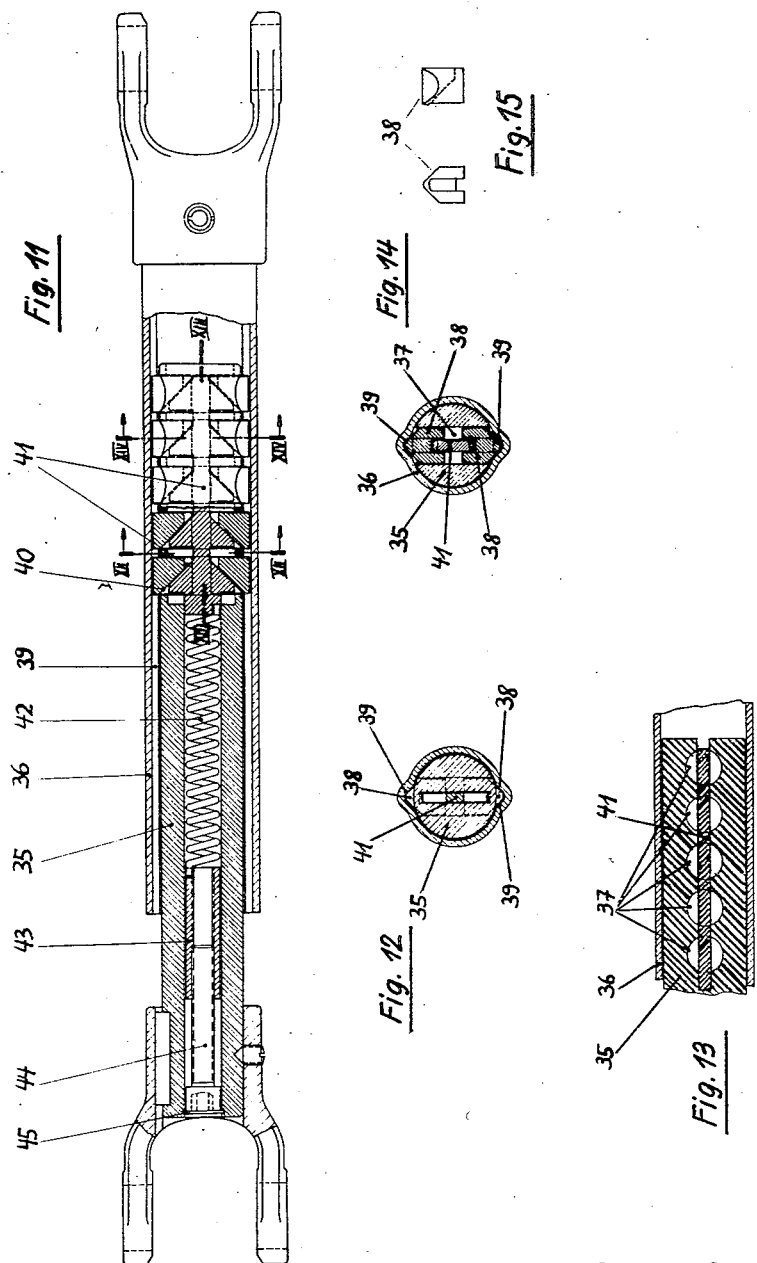

United States Patent Office 2,800,004
Patented July 23, 1957

2,800,004

MULTIPART ARTICULATED SHAFT, PARTICULARLY FOR AGRICULTURAL MACHINERY, WHICH IS VARIABLE IN LENGTH DURING SERVICE AND PROVIDED WITH A SAFETY CATCH

Kurt Schröter, Herkenrath, near Bergisch-Gladbach, Bezirk Köln, Germany

Application January 13, 1954, Serial No. 403,757

Claims priority, application Germany January 19, 1953

5 Claims. (Cl. 64—29)

The present invention relates to an articulated shaft, especially for transmitting the drive from one vehicle to another or from a tractor to a hitched-up machine. The known articulated shafts do not give satisfaction in practical service because at the high speeds of rotation, they cause detrimental vibration owing to there being too much play between the mutually shiftable, telescoping parts of the shaft, with the result that they have a very short life. Furthermore, they consume unnecessarily a great deal of power due to bad mechanical efficiency. This latter is due to a great extent to the fact that the resistance to longitudinal displacement is very great. The known constructions of the safety catch operate unreliably and wear quickly. They also occupy a great deal of space.

It is the object of the present invention to provide an articulated shaft which does not possess these disadvantages and can nevertheless be produced at a very reasonable price, a factor which is extremely important in the case of agricultural implements and machines. It also reduces the possibility of accidents and requires a minimum amount of space. Furthermore it is not possible to wrongly assemble the shafts, which in the known constructions leads to irregular running and possibly even to accidents.

According to the invention the outer part of the shaft, which is preferably constructed as a cylindrical tube, has in its interior preferably two diametrically opposite longitudinal grooves in which two likewise diametrically opposite guide members or ribs fixed to the inner part of the shaft are longitudinally shiftable. The guide members may be of rectangular or square cross-section and engage in corresponding longitudinal grooves on the inner part of the shaft, in which case they can be fixed in position by screws or pins. However, profiled tube section material might be used for the transmission shafts and provided preferably with two oppositely located beads worked from the tube wall by stamping, rolling or drawing. Under each bead there will then be a corresponding depression in the interior, in which the bead of the smaller, correspondingly profiled tube section engages. The tubular connecting parts of the joint are preferably made from the same section material as the tube shafts. They are connected with the tube shafts by being slipped in or on them and are secured against axial thrust by adapter sleeves. The tube lengths can be provided on one side with slotted reinforcements and have transverse bores through which set screws can be passed in such a manner that they engage in corresponding recesses milled in the bead on the tubes. For forming the safety catch the inner shaft part is provided with transverse bores and, instead of the ribs or beads, two dogs pressed apart by spring force are inserted in each of the bores, the heads of these dogs engage in the longitudinal grooves in the outer shaft part and allow the shaft parts to turn the one relatively to the other in the event of a certain torque being exceeded. The dogs are preferably of cylindrical cross section and roof-shaped at one end, whereas a cylindrical bore is provided in the other end. The dogs are arranged in pairs with their bores directed the one towards the other and accommodate a prestressed spiral spring. The maximum transferable torque, that is the limit at which the safety catch becomes operative, can be adjusted by varying the pretension of the springs and the number of dogs. A particularly simple method of adjustment is obtained if the carrier dogs shiftable in the transverse bores of the inner shaft part are provided with inclined faces which cooperate with a spring loaded pressure member with correspondingly inclined outer faces, in such a manner that when this serrated pressure member is shifted in the direction of the axis of the shaft all the dogs are pushed transversely to the axis of the shaft at the same time. The pressure member is arranged in a longitudinal bore in the inner part of the shaft and bears against a cylindrical spiral spring located in the same longitudinal bore; the pre-tension of this spring can be changed by another pressure member shiftable from outside. The last mentioned pressure member is preferably constructed as a sleeve with internal screw thread and which is shifted by turning a set screw. This set screw is also mounted in the longitudinal bore of the inner shaft part and supported against axial forces in one direction by a spring ring fitted in an annular groove in the longitudinal bore. The adapter sleeve for adjusting the pre-tension of the spring is secured against turning by the spring itself in that the spring, the ends of which are bent about at right angles, engages in depressions in the sleeve and the serrated pressure member. The set screw is preferably provided with a head rounded on the outside and with an inner square or hexagon by which the pretension of the spring can be adjusted with the aid of a key. The carrier dogs are in this construction provided with corresponding one-sided inclined recesses on their inner side in which the outer inclined surfaces of the serrated pressure member engage.

Several preferred embodiments of the invention are illustrated by way of example in the accompanying drawings, in which:

Fig. 1 shows the middle portion of an articulated shaft, partly in section;

Fig. 2 shows a complete articulated shaft fitted with safety catch, likewise partly in section;

Fig. 3 is a section on line III—III of Fig. 1;

Fig. 4 is a section on line IV—IV of Fig. 2;

Fig. 5 shows in a perspective view four profiled tubular shaft sections from which three different sizes of telescopic shafts can be built up, each composed of two tube sections;

Figs. 6, 7 and 8 are cross-sections each showing one of the three sizes of telescopic shafts mentioned in connection with Fig. 5;

Figs. 9 and 10 are part sectional views showing two connections of the profiled tubular shaft to a part of a joint;

Fig. 11 shows partly in longitudinal section the multipart shaft with easily adjustable safety catch;

Fig. 12 is a section on line XII—XII of Fig. 11;

Fig. 13 is a section on line XIII—XIII of Fig. 11;

Fig. 14 is a section on line XIV—XIV of Fig. 11; and

Fig. 15 shows a carrier dog in front elevation and side view.

The outer part 8 of the shaft, preferably consisting of a cylindrical tube, has in its interior two longitudinal grooves 20, preferably of rectangular cross-section, and is inserted into a cylindrical bore in a joint part 5 where it is secured against rotation and longitudinal displacement by two compound adapter sleeves 16, 17. An inner part 11 of the shaft, which is connected in a similar manner with a joint part 4 by two adapter sleeves 14, 15, is also of cylindrical cross-section and may consist of a thick walled tube as shown in Fig. 3.

In the simplest form of construction illustrated in Figs. 1 to 3, the inner part 11 of the shaft is provided with corresponding longitudinal grooves in which rods 12, preferably of square cross-section, are inserted and secured in position by pins 18. The shaft parts 8 and 11 can have a slight tolerance as regards their diameters. They form a so-called prism guided with little play by the rods 12, thereby ensuring a good degree of mechanical efficiency and slight wear. The rods 12 of the prism guide can be easily replaced. In the form of construction shown in Figs. 2 to 4 the inner part 11 of the shaft is provided with transverse bores 10. In each of these two cylindrical dogs 19 are inserted and are roof-shaped at one end and have a cylindrical bore at the other end. The bores of the dogs are directed the one towards the other and the dogs are mutually supported by a pre-stressed spiral spring 9 so that they are pressed outwardly and engage in the longitudinal grooves 20 in the outer part 8 of the shaft. The maximum torque transmittable can be accurately adjusted by the tension of the spring 9 and the number of dogs 19. When this torque is exceeded the dogs 19 will be pressed inwards and slide up to the next engagement in the cylindrical bore of the outer part 8 of the shaft. Thus a safety catch is produced which is of closed construction and consequently not susceptible to dirt, and yet is easy to lubricate, and which, in addition, requires no additional space in the longitudinal or transverse direction of the articulated shaft. This combination is also very cheap to produce and the structural elements possess maximum resistance and durability.

The tubular shafts 21, 22, 23, 24 shown in Figs. 5 to 8 all have preferably two diametrically opposite beads 25, 25¹, 26, 26¹, 27, 27¹ and 28, 28¹, which are pressed out of the wall by stamping, rolling or drawing. In this manner under each bead there is a corresponding depression in the interior in which the smaller inserted tube section has the necessary sliding fitting. As the wall thickness of the tubular parts in this construction remains the same in all zones of the circumference a very economical construction of the tubular shafts is possible. In the case of any weakening of the wall by incisions, a wall of such thickness would be necessary that the reduced cross-section at the incision point is still sufficiently strong to be able to take up all bending and torsional stresses. The beads serve chiefly for transmitting the torque between the shaft parts. Figs. 5 to 8 clearly show that the section or profile according to the invention allows extremely good guiding of the tubular shaft parts with little play, which is particularly important from the point of view of wear and security against jamming.

Figs. 9 and 10 show a joint part 29 with tubular extension 30. The tubular shaft 22 in Fig. 9 is secured against thrust by an adapter sleeve 31 driven into a transverse bore 33. In Fig. 10 the tubular extension 30 is reinforced at the top, provided with a bore 34 extending transversely to the axis of the shaft and is slit in the reinforced portion. The tubular extension 30 is tightly stretched on the shaft part 23 by a set screw 32. The transverse bore 34 is so arranged that the bead 27 on the tube part 23 is also cut and the set screw 32 affords at the same time an effective lock against axial stresses. This construction of the connection of the tubular shaft 23 to the joint part 29 is easily detachable and, whilst being very simple to produce, is extremely durable, because a firm, closed-form and positive connection is ensured capable of resisting torsional, bending an axial stresses. The tubular extension 30 of the joint part 29 is provided internally with depressions corresponding to the beads 26ᵃ, 26ᵇ of Fig. 9 and 27ᵃ, 27ᵇ of Fig. 10.

Figs. 11 to 14 show a form of construction in which the safety catch is easily adjustable. An inner shaft 35 is shiftably and rotatably mounted in an outer tubular shaft 36. Carrier dogs 38 are shiftably mounted in the transverse bores 37 in the inner shaft 35 and cooperate with longitudinal grooves 39 in the outer shaft 36 when no rotation takes place between the shaft parts 35 and 36. The carrier dogs 38 bear with their inner inclined faces 40 against a pressure member 41 which has a serrated profile composed of inclined faces at the same angle as the faces of the dogs 38. By pre-stressing a spring 42 the pressure member 41 is pushed in the direction of the shaft axis. This causes the carrier dogs 38 to be pressed against the outer part 36 of the shaft. If the torque to be transmitted exceeds a limit determined by the pre-stressing of the spring 42, the dogs 38 will be pressed out of the longitudinal grooves 39 of the outer part 36 of the shaft, slide along the inner surface of their bores and shift the pressure member 41 against the action of the spring until, after turning through an angle of 180°, they again reach the grooves 39. A sleeve 43 with internal screw thread is shifted by turning a set screw 44, the head of which has an inner hexagon, and thus changes the pre-stressing of the spring 42 or the maximum torque to be transmitted. The outer rounded end of the head of the set screw 44 bears against a ring 45 which is located with tension in outward direction in an annular groove in the inner part 35 of the shaft. The spring 42 has ends bent outward about at right angles by means of which it engages in depressions in the sleeve 43 and in the pressure member 41 and thereby secures the sleeve 43 against turning. With the aid of a key with suitable external hexagonal surface the pre-stressing of the spring 42 and consequently the pressing-on pressure of the dogs 38 or the maximum torque which can be transmitted is adjusted by turning the set screw 44.

From the above detailed description of the invention, it is believed that the construction will at once be apparent, and while there are herein shown and described preferred embodiments of the invention, it is nevertheless to be understood that minor changes may be made therein without departing from the spirit and scope of the invention as claimed.

I claim:

1. A safety-clutch articulated extensible drive shaft coupling having an outer tubular shaft with a yoke fitting fixed at one end and a drive shaft slidable in the other end, said tubular shaft having at least one axially extending, elongated, continuous internal groove, said drive shaft adjacent its inner end having a plurality of pairs of opposed ridged blocks radially slidably mounted therein with the ridges of said blocks in alignment axially of said drive shaft, and resilient means for biasing said blocks radially outwardly to urge their ridges into engagement with said elongated continuous internal groove for limited torque transmission between said drive shaft and said tubular shaft when the ridges and grooves are in engagement, said resilient means comprising axially movable wedges mounted between each pair of opposed blocks, and a compressed coiled spring mounted in an axial bore in said drive shaft for biasing said wedges to simultaneously spread said blocks for urging their ridges into the corresponding grooves.

2. A drive shaft coupling as defined in claim 1, said wedges for the several pairs of blocks being integrally mounted on a strip biased at one end by said coiled spring.

3. A drive shaft coupling as defined in claim 1, and means for adjusting the compression of said coiled spring.

4. A drive shaft coupling as defined in claim 3, said adjusting means including an internally threaded sleeve slidably mounted in said axial bore of the drive shaft at the other end of said coiled spring and a screw rotatably mounted in the outer end of said drive shaft but restricted in axial direction therein and engaged in said sleeve for adjusting the compression of said coiled spring.

5. A drive shaft coupling as defined in claim 4, said screw having a round head, a countersunk bore in the end of said drive shaft for said head, a lock ring for said head in said countersunk bore for retaining it against axial displacement therein during adjustment of said screw, and a hexagonal depression in said head for application of a hex wrench thereto for said adjustment.

References Cited in the file of this patent

UNITED STATES PATENTS

| | | |
|---|---|---|
| 73,914 | Moul | Jan. 28, 1868 |
| 1,671,521 | Fisher | May 29, 1928 |
| 2,072,924 | Smyth | Mar. 9, 1937 |
| 2,164,870 | De Salardi | July 4, 1939 |

FOREIGN PATENTS

| | | |
|---|---|---|
| 15,816 | Great Britain | Nov. 9, 1915 |